United States Patent Office 3,263,885
Patented August 2, 1966

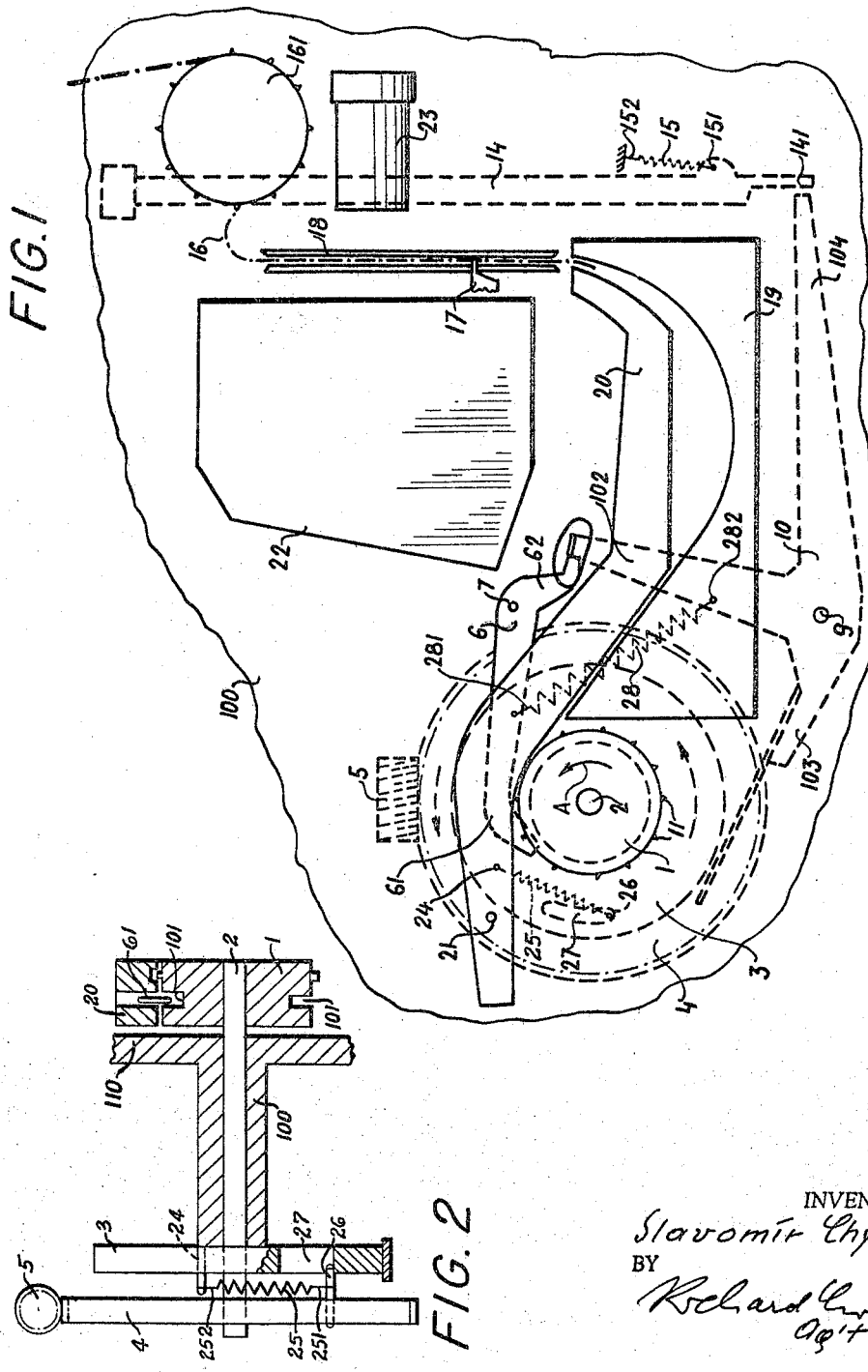

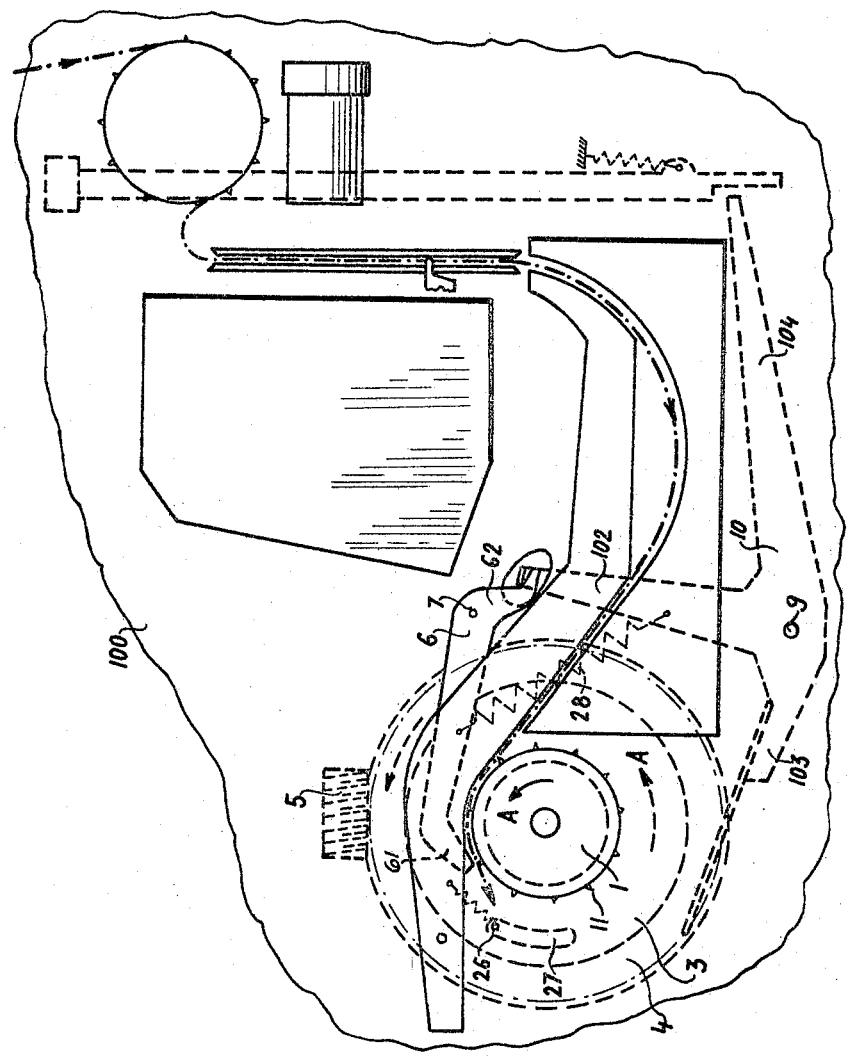

3,263,885
CINÉ PROJECTOR WITH AUTOMATIC INSERTION OF THE FILM STRIP
Slavomir Chytil, Prerov, Czechoslovakia, assignor to Meopta, narodni podnik, Prerov, Czechoslovakia
Filed Jan. 22, 1964, Ser. No. 339,541
3 Claims. (Cl. 226—91)

The present invention relates to a motion picture or ciné projector with automatic insertion of the film strip onto a feeding sprocket disposed behind the film gate, the feeding sprocket being driven by a driving mechanise of the ciné projector and being provided on its circumferential face with a radial groove which an arm of a control lever engages so that prior to the insertion of the film strip at least a portion of the arm is disposed below the level of the cylindrical outer surface of the feeding sprocket.

Ciné projectors with automatic insertion of the film strip are known in which the film strip is guided by curved guides disposed both before and behind the film gate of the ciné projector. Such guides are, prior to insertion of the film strip, set to be in a clamped position and are arrested by a catch which is mounted on one of the curvved guides near the feeding sprocket. Upon insertion, the film strip passes through the film gate and is fed by a claw downwards to the feeding sprocket, and the catch holding the two guides is only thereafter released, the guides being thus opened, whereby free channels for vibration of the film loops are formed.

The referred to known film strip insertion is disadvantageous since the film strip before it passes through the film track to the feeding sprocket is forcibly urged through the film gate whereby an inaccurate engagement of the feeding mechanism with the perforation apertures may be effected. This causes considerable wear of the film strip whose leading portion must at last be removed.

Another known type of ciné projector is provided with a pair of curved guides which fit onto each other and are swingably mounted on pivots oppositely arranged above the film gate, the curved guides being secured in a clamped position by a lever provided with a notch. The two guides open after the film strip has been inserted, caused by a mutual action of the feeding mechanism and one of the guides. Such an arrangement is disadvantageous as well since the lower feeding sprocket cannot be used and ciné projectors of this type cannot be provided with back feed.

Still other ciné projectors used for the purpose of opening the guides, upon insertion of the film strip special, contacts which switch on a circuit of electromagnets for holding the guides in clamped position. This arrangement, too, is disadvantageous since a ciné projector provided with a device of this kind is complex, which proves troublesome.

The above disadvantages are eliminated by the ciné projector according to the present invention, which is provided with automatic insertion of the film strip onto a feeding sprocket disposed behind the film gate, the feeding sprocket being driven by a driving mechanism of the ciné projector and being provided along its circumference with a radial groove which an arm of a control lever engages so that prior to the insertion of the film strip at least a portion of the arm is disposed below the level of the cylindrical outer surface of the feeding sprocket.

The invention resides, according to one aspect thereof, in the coupling of the feeding sprocket and driving mechanism of the ciné projector so that the feeding sprocket may assume, relative to the driving mechanism, two angularly different positions determined by the position of an arm of a control lever relative to a groove made along the circumference of the feeding sprocket. If the feeding sprocket is driven by a worm gear, the coupling between the gear and feeding sprocket can be made by means of an intermediate disc rigidly mounted on the shaft of the feeding sprocket, a pin rigidly fixed on the gear so that it enters a slot in the intermediate disc, and by means of a spring. The spring is secured with one of its ends to the worm gear and with its other end to the intermediate disc so that its tension causes the feeding sprocket to rotate relative to the gear of the driving mechanism in a direction opposite to the direction of rotation of the latter. The control lever is formed as a two-armed lever one arm of which or whose second arm constitutes a support for an arm or the first arm of an auxiliary lever. The other or the second arm of the auxiliary lever is made to act as a braking member when the referred to first arm of the control lever is disposed below the level of the cylindrical outer surface of the feeding sprocket. The second arm of the auxiliary lever bears on the cylindrical circumference of the intermediate disc, and the first arm of the control lever is connected to the first arm of the auxiliary lever by means of a helical spring. The auxiliary lever may be provided with three arms, the third arm being in this case adapted to tranmit the action of a spring-loaded and slidably mounted member arranged as a pull rod.

The invention is shown by way of example in the accompanying drawing wherein:

FIG. 1 is a diagram of a ciné projector according to the present invention prior to the insertion of a film strip, FIG. 2 is a diagram showing the coupling of the driving mechanism and feeding sprocket of my projector, and FIG. 3 is a diagram of the projector as shown in FIG. 1 after insertion of the film strip.

Referring now to the drawings in detail, there is shown a ciné projector 100 provided with a feeding sprocket 1 mounted on a shaft 2 together with an intermediate disc 3. Further mounted on the shaft 2 is a worm gear 4 meshing with a worm 5 driven from a driving mechanism (not shown) of the ciné projector 100. In the feeding sprocket 1 there is a groove 101 into which engages an arm 61 of a control lever 6. The intermediate disc 3 is provided with a slot 27. Into the slot 27 enters a pin 26 rigidly mounted on the worm gear 4. The intermediate disc 3 is provided with a pin 24, a spring 25 being secured to the pins 24 and 25 at its ends 251 and 252 respectively. The control lever 6 is made as a two-armed swingable lever hinged on a pivot 7. The second arm 62 of the control lever 6 constitutes a support for the first arm 102 of an auxiliary lever 10 which in the embodiment shown is formed as a three-armed lever swingable about a pivot 9. Another or the second arm 103 of the auxiliary lever 10 is formed as a brake to act upon the circumference of the intermediate disc 3, and the third arm 104 of the lever arm 10 is adapted to act upon an end 141 of a pull rod 14. The auxiliary lever 10 is disposed behind a partition of the ciné projector 100, and the arm 102 is shaped so that it reaches through a slot in said partition to the arm 62 of the control lever 6. Between the control lever 6 and the auxiliary lever 10 a spring 28 is secured with its end 281 to the arm 61 of the control lever 6 and with its other end 282 to the arm 102 of the auxiliary lever 10.

The ciné projector 100 is further provided with two curved guides 19 and 20, the curved guide 19 being rigidly connected to the projector and the curved guide 20 being swingably hinged on the projector by means of a pivot 21. The pull rod 14 is slidably secured to the projector and is provided with a spring 15 connected thereto with its end 151 while its other end 152 is connected to the projector 100. There are further shown a lamp housing 22, a claw 17, a film gate 18 with the inserted film strip 16 fed thereto from a feeding sprocket 161. Before the film gate 18, a projection lens 23 is arranged in a known manner.

The automatic insertion of the film strip 16 onto the feeding sprocket 1 takes place as follows. The second arm 103 of the auxiliary lever 10 acts as a brake on the circumference of the intermediate disc 3. On actuation of the driving mechanism of the ciné projector 100, the intermediate disc 3 is set in rotary motion by means of the worm 5 and worm gear 4, and the feeding sprocket 1 is set in rotary motion as well in direction of the arrow A. The rotation is transmitted from the worm gear 4 to the feeding sprocket 1 and intermediate disc 3 by means of the spring 25. Since the intermediate disc 3 is braked by the second arm 103 of the auxiliary lever 10, it partly rotates relative to the worm gear 4 in a direction opposite to that indicated by the arrow A whereby the pin 26 acts against the resistance brought about by the braking action on the circumference of the intermediate disc 3 and carries along the intermediate disc 3 by bearing against a front rim of the slot 27 as is apparent from FIG. 1. The film strip 16 passing from the feeding sprocket 161 to the film gate 18 is fed by a claw 17 between the curved guides 19 and 20 and farther to the feeding sprocket 1. As soon as the film strip 16 is engaged by teeth 11 of the feeding sprocket 1, it continues moving and thus lifts the arm 61 of the control lever 6. By swinging the control lever 6 about the pivot 7 the auxiliary lever 10 which bears with its first arm 102 against the arm 62 of the control lever 6, is released whereby the arm 102, urged by the spring 28, assumes the position shown in FIG. 3. The second arm 103 of the lever 10 no longer bears against the circumference of the intermediate disc 3, which relieves the intermediate disc 3 of its braking action. Due to the tension of the spring 25 the intermediate disc 3 is partly rotated relatively in the same direction as the worm gear 4 in the direction of the arrow A. The pin 26 now bears against the other rim of the slot 27 as shown in FIG. 3. As the intermediate disc 3 rotates partly, the feeding sprocket 1 rotates partly at the same time, so that the film strip 16 originally resting on the curved surface of the guide 19 forms, owing to the shortening of is length between the feeding sprocket 1 and the film gate 18, a free loop between the curved guides 19 and 20, as shown in FIG. 3.

In case the mechanism has to be repeatedly prepared for automatic insertion of the film strip, by the action of the end 141 of the pull rod 14 on the third arm 104 of the auxiliary lever 10, the original position shown in FIG. 1 can once more be set and secured by the arm 62 of the control lever 6. The pull rod 14 may advantageously be used for coupling with another mechanism of the ciné propector 100, e.g. with a mechanism for automatic insertion disposed in the upper part of the projector (not shown).

The embodiment described is only one of more possible arrangements, e.g. the spring 25 can be substituted by a cylindrical spring coaxially mounted on the shaft 2 or by a spiral spring. Further, the auxiliary lever 10 may be made as a two-armed one, etc.

What I claim is:

1. A ciné projector having means for automatic insertion of the film strip onto a feeding sprocket disposed behind the film gate, the said feeding sprocket being driven by driving mechanism of the ciné projector and provided along its circumference with a radial groove into which an arm of a control lever engages so that prior to insertion of the film strip at least a portion of the said arm is disposed below the level of the cylindrical outer surface of the feeding sprocket, coupling of the feeding sprocket to the driving mechanism of the ciné projector being effected so that the feeding sprocket may assume, relative to the driving mechanism, two angularly different positions determined by the position of the arm of the control lever relative to the radial groove on the circumference of the feeding sprocket.

2. A ciné projector according to claim 1, in which the feeding sprocket is driven from a worm gear, the coupling between the worm gear and the feeding sprocket being made by means of an intermediate disc rigidly mounted on a shaft of the feeding sprocket, by means of a pin rigidly mounted on the worm gear so that it engages in a slot in the intermediate disc, and by means of a spring which has its one end secured to the worm gear and its other end to the intermediate disc so that its tension holds the feeding sprocket partly rotated relative to the worm gear of the driving mechanism in a direction opposite to the direction of rotation of the latter, the control lever being formed as a two-armed lever whose second arm constitutes a support for the first arm of an auxiliary lever, the second arm of the auxiliary lever being formed as a braking member acting so that in case the first arm of the control lever is disposed below the level of the cylindrical outer surface of the feeding sprocket the second arm of the auxiliary lever bears on the cylindrical circumference of the intermediate disc, the first arm of the control lever being connected to the first arm of the auxiliary lever by means of a helical spring.

3. A ciné projector according to claim 2, wherein the auxiliary lever is made as a three-armed lever, the third arm thereof being adapted to transmit the action of a spring-loaded and slidably mounted member which is arranged as a pull rod.

References Cited by the Examiner

UNITED STATES PATENTS

| 1,987,406 | 1/1935 | May | 352—158 |
| 2,420,587 | 5/1947 | Dietrich | 226—91 X |
| 3,029,686 | 4/1962 | Bernzott | 226—91 |
| 3,081,925 | 3/1963 | Hanken | 226—91 |

M. HENSON WOOD, JR., *Primary Examiner.*

A. N. KNOWLES, *Assistant Examiner.*